July 24, 1956  O. T. WEBBER  2,755,795
MULTIPURPOSE COOKER
Filed Sept. 4, 1951  2 Sheets-Sheet 1
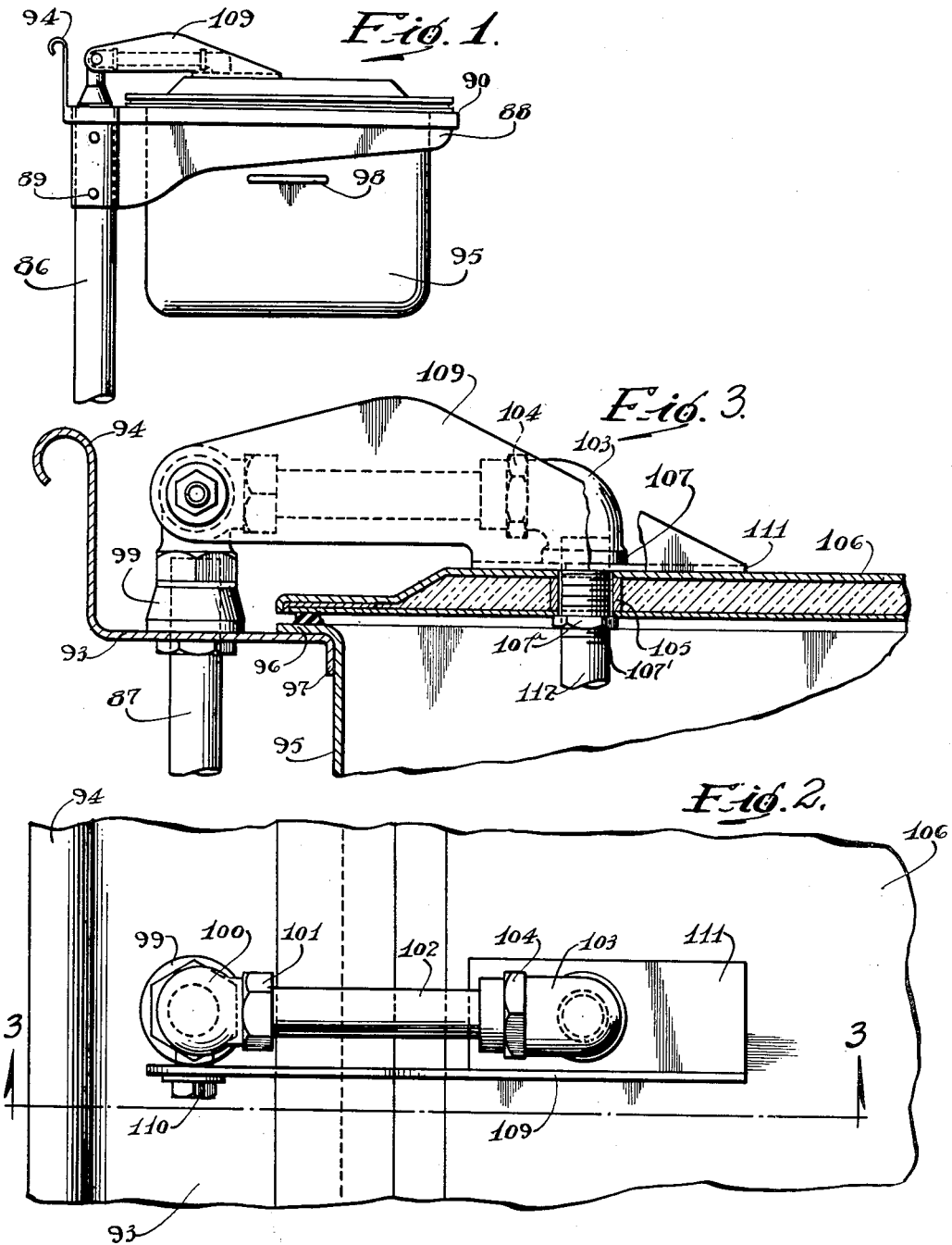
INVENTOR
Owen T. Webber
BY *Cushman Darby Cushman*
ATTORNEYS July 24, 1956  O. T. WEBBER  2,755,795
MULTIPURPOSE COOKER
Filed Sept. 4, 1951  2 Sheets-Sheet 2
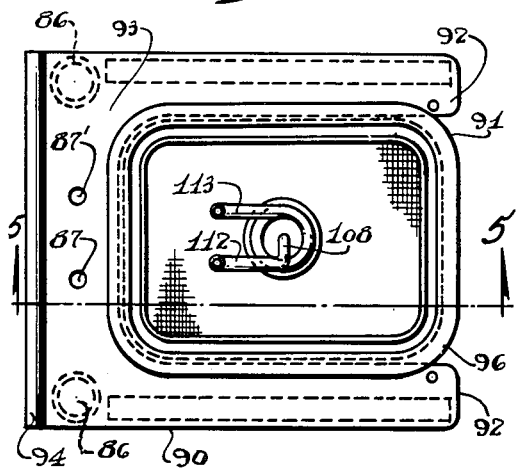
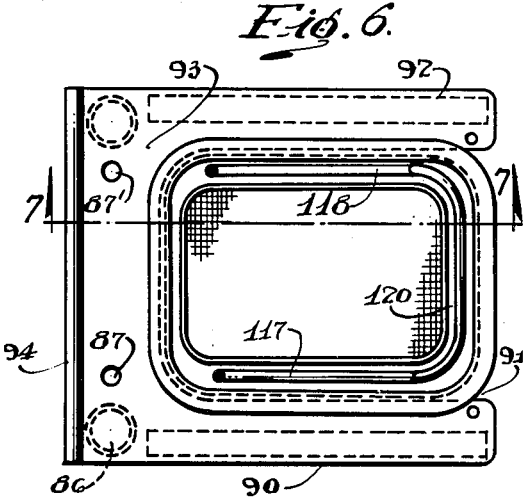
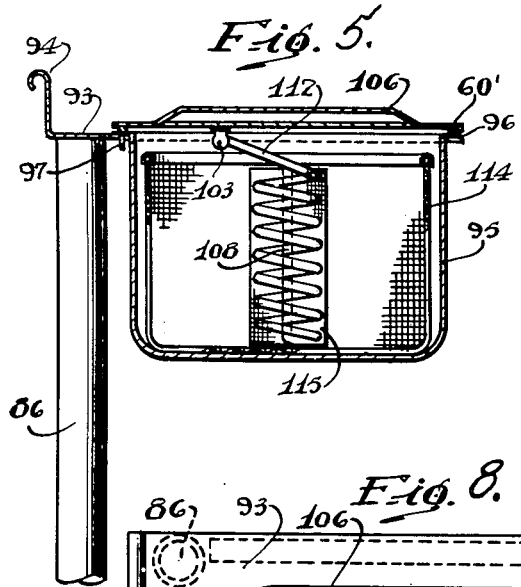
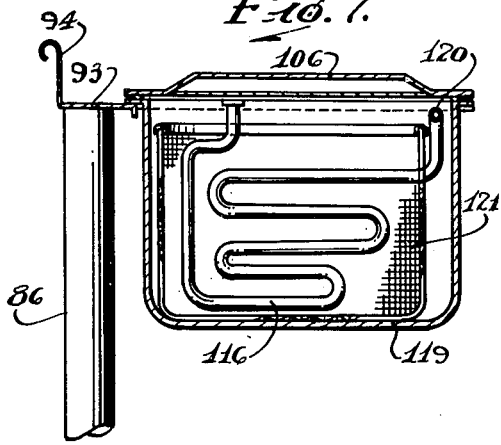
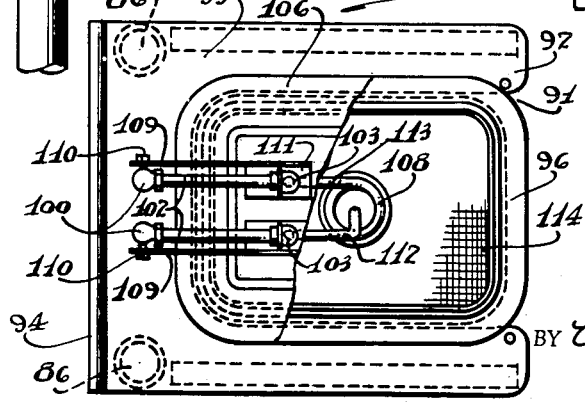
INVENTOR
Owen T. Webber
BY Cushman Darby Cushman
ATTORNEYS

2,755,795

MULTIPURPOSE COOKER

Owen T. Webber, New York, N. Y., assignor to Victor K. Scavullo, Angelo C. Scavullo, Charles J. Scavullo, Angela M. Scavullo, Margaret M. Scott and Marie I. Saegert, constituting a partnership doing business as Legion Utensils Co., Long Island City, N. Y.

Application September 4, 1951, Serial No. 245,048

3 Claims. (Cl. 126—366)

The present invention relates to a multi-purpose cooker adapted for use in kitchens where the space is extremely restricted such as in dining cars, galleys of ships and the like.

An important object is to provide a simple, efficient and durable cooker which embodies in a single unitary structure means for using the cooker for different heating purposes such as a pressure cooker, a waterless cooker, a roaster or a kettle.

Another object comprehends the provision of a cooker which will occupy a minimum of floor space and is supported by a cantilever bracket that may conveniently be mounted on the bulkheads of ships and railroad cars, so as to allow close positioning of the cooking assembly that leaves the floor clear and accessible for cleaning. The cooker or receptacle has a hinged lid and is arranged to receive heating elements in the form of a steam coil and also an electrical heating means. The steam coil is pivotally mounted within the cooker so as normally to extend vertically therein and when the lid is opened, the steam coil is swung upwardly and outwardly so as to allow convenient access to the receptacle. Additionally, the steam coil when positioned within the cooker may be enclosed within a perforated guard member so as to prevent contact therewith of solid food materials while permitting free liquid flow.

Another object consists in mounting one or more of the cookers on a work-top, drainboard, or the like so as to conserve floor space in order that this dimensional saving can be used to provide additional working areas.

Other objects and advantages of the invention will become apparent from the following description when taken in conjunction with the accompanying claims and drawings.

Referring to the drawings:

Figure 1 is a side view of a cooker in accordance with my invention showing a removable kettle bowl mounted on a standard or support.

Figure 2 is a detailed enlarged plan view of Figure 1.

Figure 3 is a sectional view taken substantially along the line 3—3 of Figure 2.

Figure 4 is a detailed plan view of Figure 1 with the cover removed.

Figure 5 is a sectional view taken substantially along the line 5—5 of Figure 4.

Figure 6 is a view similar to Figure 4 of a modified form of kettle structure.

Figure 7 is a sectional view taken along the line 7—7 of Figure 6, and

Figure 8 is a plan view of Figure 1 showing the cover partially removed.

In the cooker of my invention as shown in Figs. 1–5, inclusive, and Fig. 8, a pair of vertically spaced standards 86 extend upwardly from the floor or deck and each has a bracket 88 secured to the upper end thereof as at 89. A flat base or supporting member 90 (Fig. 4) of any suitable light durable material has one or more elongated recesses or side openings 91 forming kettle bays. The opposed side walls of each recess 91 have horizontally spaced arms or flanges 92 connected at their rear ends by a transverse web 93 having an upwardly extending stop flange 94. A removable kettle bowl or receptacle 95 is associated with the base 90 and may be of any suitable size and shape to slidably fit within the side openings 91. The kettle 95 at its upper end has a continuous annular flange 96 arranged to rest on the upper surface of the arms 92 and the transverse portions 93, so as to be removably supported thereby. The base member 93 has a depending flange 97 (Fig. 3) to provide a stop for the kettle 95 when mounting the same on the support. Opposite sides of the kettle 95 may be provided with handles 98 to facilitate the manipulation thereof.

Extending upwardly through transverse openings in the plate 90 are spaced parallel pipes 87 and 87' (Fig. 4) one of which, such as the pipe 87, may constitute an inlet supply line for the heating medium, such as steam, and the pipe 87' an outlet or discharge therefor. To the upper end of each of the pipes 87 and 87' there is connected a combined hinge and fluid supply fitting 99 (Fig. 3) that communicates with a swivel joint 100 connected by the coupling nut 101 to one end of a pipe 102 (Fig. 2) which at its opposite end is connected to an elbow 103 by a nut 104. The opposite or depending end of the elbow 103 has an internally threaded portion 107 which aligns with an opening in the cover 106 (Fig. 3) and a spacer 105 so as to be connected to a centrally disposed heating coil 108 in any suitable manner. As shown, the upper end 112 of the coil 108 is threaded as at 107' to engage the threaded portion 107 of the elbow 103 and the spaced retaining nut 107ª. A gasket or seal 60' is suitably connected to the underside of the cover 106 (Fig. 5) so that when the latter is in its closed position, the gasket 60' continuously engages the flange 96 of the receptacle 95 for the purpose of providing a tight seal so as to prevent the escape of the heating medium from the receptacle.

An arm 109 (Fig. 2) is pivotally connected at one end, 110, to the swivel joint 100. At its opposite end it is provided with an angularly disposed flat portion 111 which fits against the top of the cover 106 and which has an opening for receiving the end 112 of coil 108 which passes thorugh the cover. Arm 109 and cover 106 therefore are securely clamped between elbow fitting 103 and the retaining nut 107. The other standard 86 is similarly provided with an arm 109 which is clamped securely against cover 106 between a similar elbow and a retaining nut threadedly engaging end 113 of coil 108. Cover 106 and coil 108 are raised or lowered together, relative to the kettle 95, about the swivel pivots 110 of the arms 109, the arms taking the strain off the pipe fittings 99 and swivel joint 100. It will be noted that when the cover is raised the arms 109 lie against the vertical flange 94 which constitutes a retaining stop or rest for the cover so as to allow insertion of kettle 95 into the opening 91 for support by sides 92 and convenient removal therefrom, free of obstruction by cover and heating member 108.

The opposite end portion 113 of the coil 108 may constitute the outlet and is connected to the elbow 103 in a manner as shown in Figure 8. Thus, it will be seen that the cover 106 together with the heating coil 108 and their associated parts may be swung about the pivotal connection 100 so as to either close or permit convenient access to the receptacle 95. Further, that the heating medium is supplied to the coil 108 through one of the swivel joints 100 and is withdrawn from the coil 108 through the other swivel joint 100 (Fig. 8). A wire mesh basket 114 may be positioned within the receptacle 95 so as to receive the heating coil 108. The coil 108 may be enclosed within a centrally disposed perforated guard 115 to prevent contact of the food or material in the basket 114 with the heating coils during the heating or treating operation.

In the modified form of the invention shown in Figs. 6 and 7, the heating coil 116 instead of being centrally disposed within the receptacle, is shaped so as to have opposed portions 117 and 118 disposed adjacent the opposite sides of the receptacle 119 and a transverse portion 120 (Fig. 6). The side and end portions of the coil 116 are positioned between the receptacle and the outer wall of the wire mesh basket 121 so that the basket 121 constitutes means for preventing the material from contact with the heating coil. The opposite ends of the heating coil 116 are suitably connected to swivel elbows (not shown) similar in construction to the elbows 103 and their associated parts, previously described. In this form of the invention, the basket acts as a shield for the coil, thus dispensing with the use of the guard 115. It will be manifest that while the heating coils have been shown positioned centrally within the kettle (Fig. 4) and on the outside thereof, that these heating units may be in the form of a substantially flat pad or pan pivotally connected to the cover and arranged to be swung inwardly into the kettle so as to be positioned adjacent the bottom thereof.

It will be seen that the removable receptacle associated with the kettle cooker provides means for conveniently conveying the cooked food or material to parts of the kitchen for further treatment or may be used to dispense or serve the food. Each of the kettle cookers may be provided with a plurality of these removable receptacles having the handles 98 to facilitate lifting or carrying the same. Additionally, supplementary light metal covers may be provided so as to retain the cooked material at a desired temperature and prevent unnecessary exposure or contamination of the cooked material. The kettle cooker with the removable receptacle is especially useful in operating a battery of kettles for cooking a small quantity of food such as where the cooked food material is replenished at predetermined intervals. The size and shape of the kettle cooker and its associated parts may vary, depending upon the particular use and purpose to which the cooker is to be applied.

By reason of the simple, compact and multiple uses to which the cooker may be applied, it will be seen that it may be installed at a minimum expense and at a substantial reduction in floor space and provide an effective sanitary structure that substantially reduces the overhead and cost of maintenance of devices of this character.

It will be seen that the cooker is admirably suited for use as a pressure cooker where it is essential within a wide range to rapidly cook the food under normal pressures of from 5 to 7 pounds in a tightly secured covered vessel. Moreover, the assembly may be efficiently used as a water cooker for a large range of cooking without immersion of the food material in water but actually cooking by utilizing the water content of the food material due to the fact that most foods have a high water content.

The device is capable with equal facility of being efficiently used as a roaster where meat in bulk is to be roasted in thermostatically controlled temperatures with a full range up to 500° F. where the heat normally provided by a commercial oven can be duplicated with the advantage that any degree of steam can be introduced to accelerate the cooking, reduce shrinkage and to tenderize the food as a result of the roasting operation.

It will be understood that the several forms of the invention shown and described are merely illustrative of preferred embodiments and that such changes may be made as come within the scope of the following claims.

I claim:

1. A cooker of the class described including in combination a fixed base comprising spaced horizontal parallel arms connected by a transverse web so as to form a support with an open bay of substantially uniform width; a receptacle having a lateral outwardly projecting flange extending adjacent the upper portions thereof and arranged to slidably engage the supporting sides of the bay upon introducing the receptacle into the bay so as to be supported thereby; a pair of spaced pipes extending upwardly through said base; a movable heating member having a fluid passage therein and arranged to be positioned within the receptacle, said heating member having inlet and outlet ends for conducting a fluid heating medium into and out of the member; means pivotally connecting the inlet and outlet ends of said heating member with said pair of pipes; a cover for the receptacle secured to the inlet and outlet ends of said heating member; and arm means attached to the cover and operatively associated with said pivotally connecting means and pivotally connecting said cover to said fixed base, said cover when in its closed position arranged to provide a sealing contact with the receptacle and in its open position affording free access to said receptacle so as to permit ready sliding removal thereof.

2. A cooker having a base with horizontal arms and transverse web forming an open bay, a receptacle received in such bay, and a cover for the receptacle as called for in claim 1, wherein said arms and web comprise an upper surface of sheet metal and a portion of the web rearwardly of the open bay extends upwardly to form a stop for said cover when thrown back to give access to said receptacle.

3. A cooker having a receptacle, a heating member therefor, and a cover as called for in claim 1, wherein said heating member is secured centrally of said cover and a collendar basket of shape generally conforming to that of said receptacle is supported within and by the receptacle, and said heating member is positioned centrally within said basket and receptacle when said cover and attached heating member is brought down on said receptacle.

References Cited in the file of this patent

UNITED STATES PATENTS

| | | |
|---|---|---|
| 522,586 | Cascaden | July 10, 1894 |
| 1,136,277 | Schlueter | Apr. 20, 1915 |
| 1,770,008 | Pabst | July 8, 1930 |
| 2,084,614 | Goecke | June 22, 1937 |
| 2,142,019 | Warner | Dec. 27, 1938 |
| 2,325,703 | Nute et al | Aug. 3, 1943 |

FOREIGN PATENTS

| | | |
|---|---|---|
| 450,324 | Great Britain | July 15, 1936 |